G. B. JACKSON.
SHAFT COLLAR.
APPLICATION FILED NOV. 11, 1911.
1,045,980.
Patented Dec. 3, 1912.
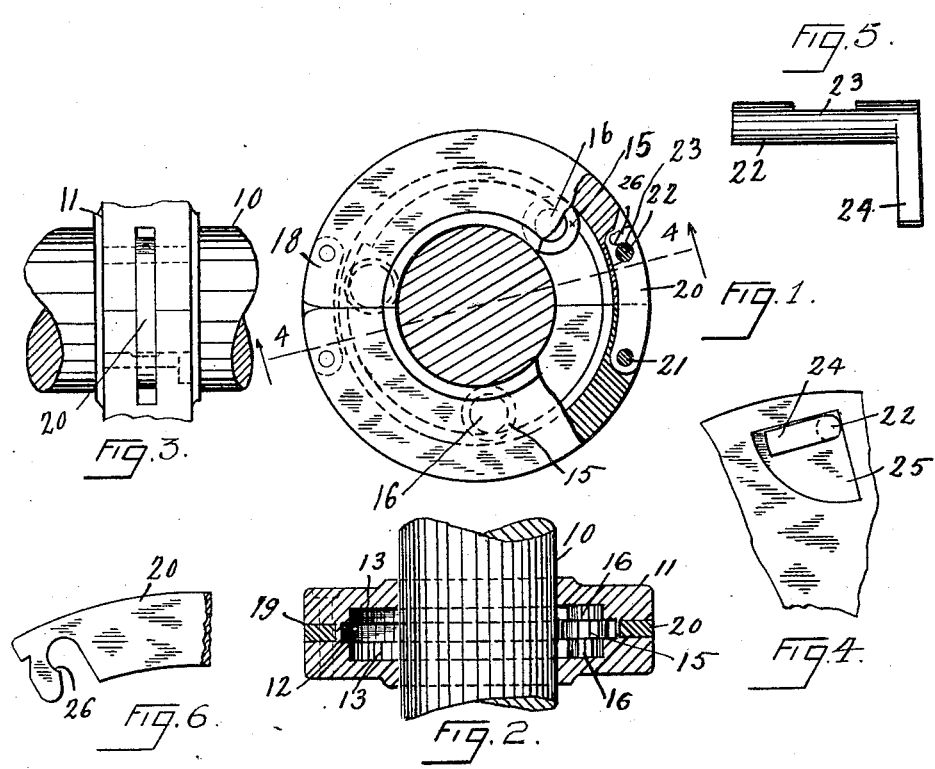
Witnesses.
Frank Waterfield
Inventor.
George B. Jackson

UNITED STATES PATENT OFFICE.

GEORGE B. JACKSON, OF LOS ANGELES, CALIFORNIA.

SHAFT-COLLAR.

1,045,980.

Specification of Letters Patent.   Patented Dec. 3, 1912.

Application filed November 11, 1911.   Serial No. 659,857.

*To all whom it may concern:*

Be it known that I, GEORGE B. JACKSON, a citizen of the United States, residing at the city of Los Angeles, county of Los Angeles, and State of California, have invented new and useful Improvements in Shaft-Collars, of which the following is a specification.

My invention relates to means for securing a collar upon the shaft without the necessity of using projecting parts, such as the heads of set screws; and the object thereof is to so construct a shaft collar that it may be quickly put upon the shaft and adjusted thereon to any desired position and firmly secured in place without the employment of any projecting parts, such as set screws. I accomplish this object by the collar described herein and illustrated in the accompanying drawings forming a part hereof, in which:—

Figure 1 is an end view partly broken away of the detachable collar. Fig. 2 is a section on the line 4—4 of Fig. 1. Fig. 3 is a fragmental edge elevation of the hook end of the collar shown in Fig. 1. Fig. 4 is an enlarged fragmental detail of the handle end of the locking pin and socket for the handle of Fig. 1. Fig. 5 is an enlarged side elevation of the locking pin. Fig. 6 is an enlarged fragment of the hook of the locking bar.

In the drawings 10 is a shaft upon which is secured a collar or shell 11 which snugly fits the shaft. In the interior of the collar is a concentric circular chamber 12 and at each side of the circular chamber 12 is a spiral chamber 13, that is, a chamber which commences at any given point on the shaft and its perimeter extends around the shaft and gradually increases its distance from the shaft until it reaches a radial line extending through its starting point and the center of the shaft. Locking rollers 15 are mounted in these chambers. The peripheries of the spiral chambers are formed by the inner surface of that portion of the collar to the outside thereof. These locking rollers have trunnions 16 which are adapted to bear upon the portions of the collar forming the periphery of the casing forming the spiral chambers which form a track for the trunnions. The body of the roller bears against the shaft.

My collar is divided into halves longitudinally. At one side of the collar the halves are connected by a bar hinge 18 which is received in recesses, one of which 19 is shown in Fig. 2. On the other side is a bar lock or catch 20 which is pivotally connected by pin 21 to one of the halves of the collar. A locking pin is revolubly mounted in the other half of the collar and consists of a round bar 22 having a flattened portion 23 and a short handle 24. The handle of this bar is received in a recess or socket 25 in the side of the collar in which recess it has a movement sufficient to permit the pin to be rotated a quarter turn. When it is desired to place the split collar upon a shaft the handle is turned to the outer side of the recess so as to bring the flat portion of the pin in the position shown in Fig. 1, in which position the hook 26 of the locking bar will pass into the recess over the flattened portion of the pin. The pin can be then rotated a quarter turn which will bring a circular portion of the pin into position to engage the hook and keep it from turning outwardly until the pin is again rotated. With the split collar the locking rollers can be put into the collar before the locking bar is fastened.

By the construction of the collar with a concentric chamber, and spiral chambers on each side of the concentric chamber, of less depth than the concentric chamber, a number of locking rollers can be used to engage the shaft upon which the collar is to be locked at equi-distant points of the circumference thereof, it only being necessary to proportion the diameter of the trunnions of the locking rollers to engage the periphery of the spiral chambers at different points when the body of the roller engages the shaft. It will be observed that the portions of the collar which form the peripheries of these spiral chambers form tracks for the trunnions of the locking rollers and that there is less pitch to these tracks than where the tracks are formed eccentric to the shaft as shown in the patent to "Kelly" dated May 31, 1910, No, 959,752, or McDonald, dated Feb. 25, 1890, No. 422,025, and therefore the rollers have a much stronger wedging effect than with the eccentric tracks before mentioned.

Having described my invention what I claim is;

1. A shaft collar comprising a shell longituidnally divided into halves, said shell having an internal concentric chamber and a single spiral chamber of less depth on each side of the concentric chamber, said chambers extending entirely around the shell in a single convolution of gradually decreasing depth from the commencement to the end; means to removably secure said halves together upon a shaft; in combination with a plurality of locking rollers, each having a body adapted to engage the shaft upon which the collar is used and trunnions of different diameters, the trunnions being adapted to engage those portions of the shell which form the peripheries of the spiral chambers when positioned for use.

2. A shaft collar comprising a shell longitudinally divided into halves, said shell having an internal concentric chamber and spiral chambers of less depth on each side of the concentric chamber the outer surface of each spiral chamber consisting of a convolution of gradually decreasing depth from its commencement to the end; a hinge connecting said halves on one side thereof; a hook pivotally secured to one half of the collar; means to lock the hook into engagement with the other half of the collar when positioned for use; in combination with a locking roller having a body adapted to engage the shaft upon which the collar is used and trunnions adapted to engage the peripheries of the spiral chambers when positioned for use.

In witness that I claim the foregoing I have hereunto subscribed my name this 6th, day of November, 1911.

GEORGE B. JACKSON.

Witnesses:
G. E. HARPHAM,
FRANK WATERFIELD.

Copies of this patent may be obtained for five cents each, by addressing the "Commissioner of Patents, Washington, D. C."